(12) United States Patent
Kumagai et al.

(10) Patent No.: US 7,835,255 B2
(45) Date of Patent: Nov. 16, 2010

(54) IDENTIFICATION INFORMATION RECORDING APPARATUS AND IDENTIFICATION INFORMATION RECORDING METHOD FOR AN OPTICAL DISK

(75) Inventors: Masafumi Kumagai, Hamamatsu (JP); Mitsuaki Oshima, Kyoto (JP)

(73) Assignee: Panasonic Corporation (JP)

( * ) Notice: Subject to any disclaimer, the term of this patent is extended or adjusted under 35 U.S.C. 154(b) by 1081 days.

(21) Appl. No.: 11/458,777

(22) Filed: Jul. 20, 2006

(65) Prior Publication Data
US 2007/0019519 A1 Jan. 25, 2007

(30) Foreign Application Priority Data
Jul. 22, 2005 (JP) .............................. 2005-212530

(51) Int. Cl.
*G11B 7/00* (2006.01)
(52) U.S. Cl. ................... 369/116; 369/52.1; 369/59.11; 369/121
(58) Field of Classification Search ............... 369/52.1, 369/59.11, 116, 121
See application file for complete search history.

(56) References Cited

U.S. PATENT DOCUMENTS

| 5,450,383 | A | * | 9/1995 | Call et al. ................. 369/47.52 |
| 5,453,961 | A | * | 9/1995 | Brazas ..................... 369/44.23 |
| 5,530,688 | A | * | 6/1996 | Hurst et al. ................. 369/116 |
| 2002/0191512 | A1 | * | 12/2002 | Arioka et al. ............ 369/47.53 |
| 2005/0041548 | A1 | * | 2/2005 | Masui ..................... 369/47.53 |
| 2005/0201226 | A1 | * | 9/2005 | Lee et al. ................. 369/44.32 |
| 2006/0209660 | A1 | * | 9/2006 | Ogata ........................ 369/121 |
| 2009/0022041 | A1 | * | 1/2009 | Kuroda ...................... 369/121 |

FOREIGN PATENT DOCUMENTS

| JP | 2001076345 | A | * | 3/2001 |
| JP | 2001236645 | A | * | 8/2001 |
| JP | 2005-11435 | A | | 1/2005 |
| JP | 2005025823 | A | * | 1/2005 |

OTHER PUBLICATIONS

Office Action for JP Appln. No. 2005-21253; dated Sep. 15, 2009 in connection with corresponding the Japanese Application.

* cited by examiner

*Primary Examiner*—Wayne R Young
*Assistant Examiner*—Brenda Bernardi
(74) *Attorney, Agent, or Firm*—Rossi Kimms & McDowell LLP (57) ABSTRACT

A media ID recording apparatus has an optical pickup 20 for forming an elongated optical spot on a recording surface of an optical disk DK; and a support table 32 for fixedly supporting the optical pickup 20. The optical pickup 20 is fixed to the support table 32 via a wedge-like spacer 33 as tilted toward the radial direction of the optical disk DK. The focal position of the elongated optical spot at the rear side in the moving direction is matched to the recording surface of the optical disk DK and the focal position of the optical spot at the front side in the moving direction is shifted from the recording surface of the optical disk DK, whereby the light intensity of the optical spot at the front side in the moving direction becomes smaller than the light intensity of the optical spot at the rear side in the moving direction. A media ID is recorded on the optical disk DK by using the optical spot thus set.

17 Claims, 9 Drawing Sheets

IDENTIFICATION INFORMATION RECORDING APPARATUS AND IDENTIFICATION INFORMATION RECORDING METHOD FOR AN OPTICAL DISK

BACKGROUND OF THE INVENTION

1. Field of the Invention

The present invention relates to an identification information recording apparatus and an identification information recording method for an optical disk that records on an optical disk such as Blu-ray Disk or HD-DVD identification information for discriminating an optical disk from another optical disk.

2. Description of the Related Art

Conventionally, identification information (media ID) specific to every optical disk is recorded on an optical disk such as Blu-ray Disk or HD-DVD in order to manage the optical disk during its manufacture and storage or during its distribution and sale. In general, the identification information is represented by a barcode and recorded to a BCA (Burst Cutting Area) or NBCA (Narrow Burst Cutting Area) formed at the innermost peripheral portion of the optical disk.

Figure 9A:
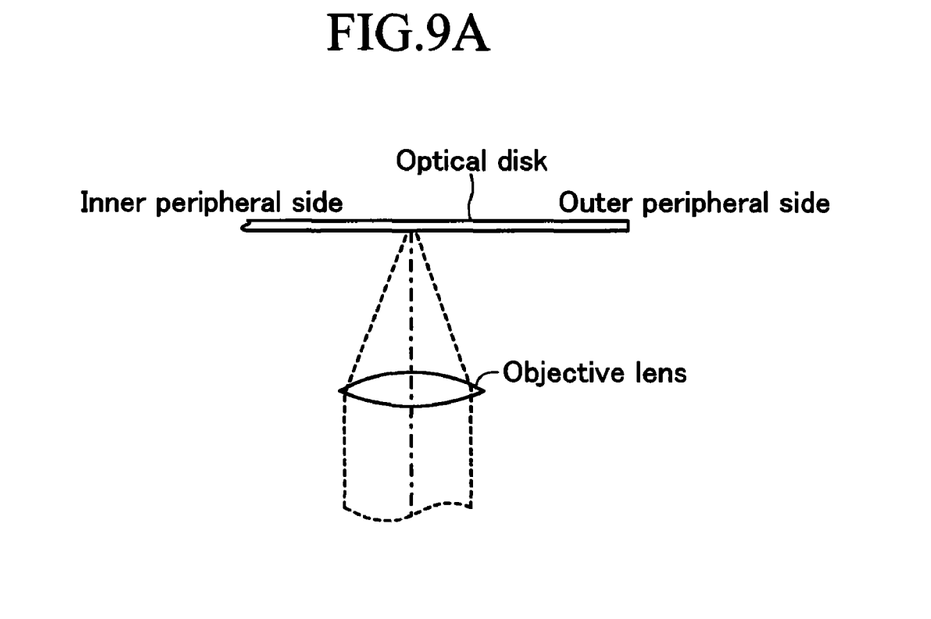
FIG. 9A is a schematic illustration showing a relationship between an optical axis of laser beam and an optical disk in a conventional example.
Figure 9B:
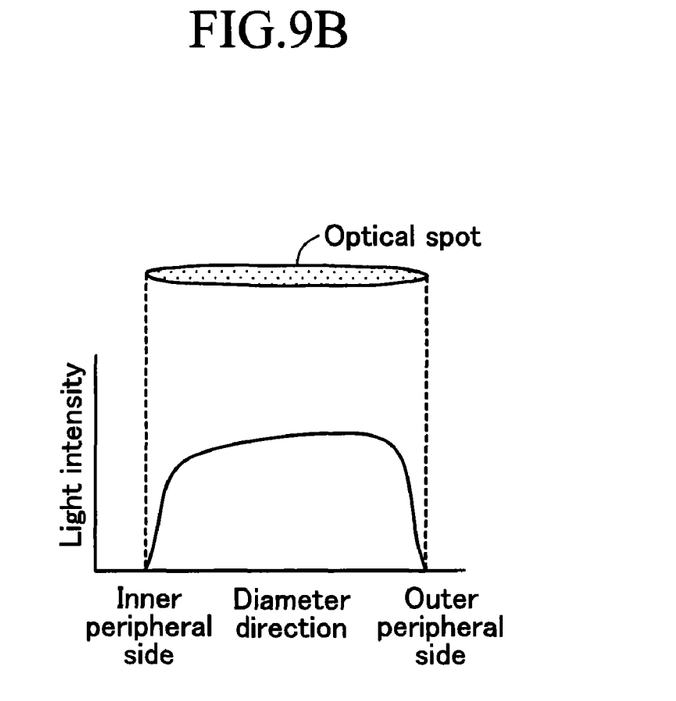
FIG. 9B is a schematic illustration showing a light intensity distribution of an optical spot in a conventional example.

The identification information is recorded such that an elongated optical spot is formed on the BCA (or NBCA) of the optical disk along the radial direction of the optical disk for melting to remove the reflection layer formed on the optical disk. In an identification information recording apparatus disclosed in JP2005-11435A, for example, as shown in FIG. 9A, laser beam is irradiated in the direction vertical to the optical disk to form an elongated optical spot on the optical disk, wherein the optical spot is moved toward the outer side from the inner side of the optical disk with the edge portions of the optical spot in the longitudinal direction overlapped with each other, thereby forming the identification information represented by a barcode at the BCA (or NBCA) of the optical disk. In this case, as shown in FIG. 9B, the light intensity distribution of the elongated optical spot is such that the light intensity at the front side in the moving direction of the optical spot is set higher than the light intensity at the rear side in the moving direction. The reason why the light intensity at the front side in the moving direction of the optical spot is set higher is that the generation of semi-molten articles or molten residues of the reflection layer, which is likely to be produced at the front side in the moving direction, is prevented in order to record the barcode with high precision.

Figure 10A:
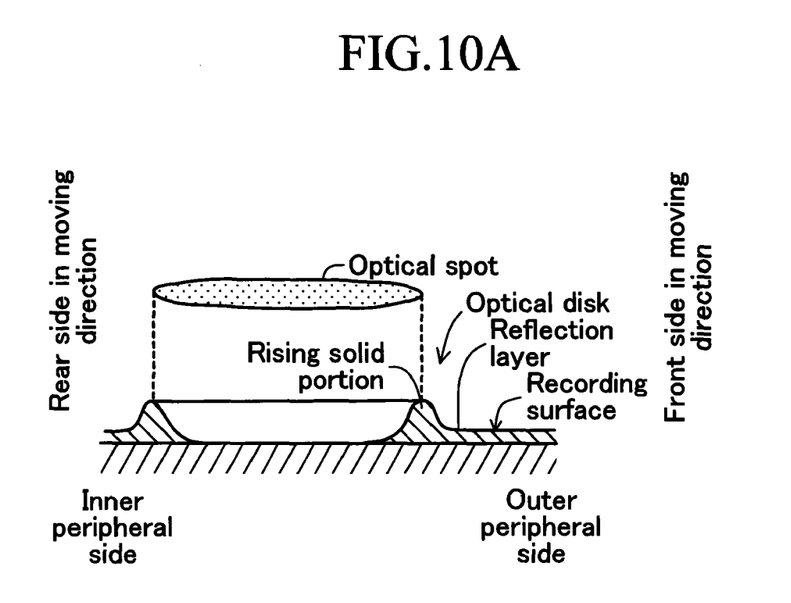
FIGS. 10A and 10B are schematic illustrations for explaining a molten state of a reflection layer in a conventional example when an optical spot is formed on a recording surface of an optical disk.
Figure 10B:
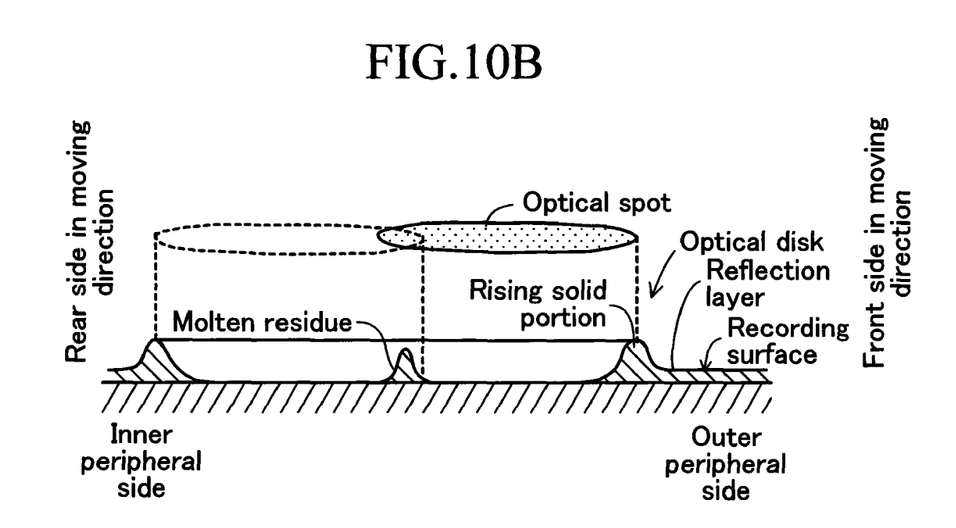

However, as a result of the experiment, carried out by the present inventor, for recording a barcode on an optical disk with the above-mentioned light intensity distribution of the optical spot, stripes are generated in the radial direction of the optical disk, and hence, the barcode cannot precisely be recorded. The guess of the result of this experiment is as follows. The reflection layer of the optical disk on which the optical spot is formed is melted by the heat of the optical spot, and removed around the optical spot. In this case, as shown in FIG. 10A, the light intensity at the front side in the moving direction of the optical spot is high, whereby the reflection layer of the optical disk at the front side in the moving direction is rapidly melted to greatly rise upward due to the surface tension. After being cooled, the rising solid portions remain. As shown in FIG. 10B, the optical spot moves to the outer side of the optical disk, and a part of the rear side of the optical spot in the moving direction is formed on the rising solid portion, but the rising solid portion is not perfectly melted and remains unremoved since the light intensity at the rear side of the optical spot in the moving direction is low.

Therefore, the rising solid portion remains as a molten residue at the BCA (or NBCA) of the optical disk along its circumferential direction. This molten residue appears as a stripe pattern along the radial direction of the optical disk. This deteriorates the reproducing precision of a signal read from the BCA (or NBCA) of the optical disk, thereby entailing a problem that the identification information recorded to the BCA (or NBCA) cannot correctly be reproduced.

SUMMARY OF THE INVENTION

The present invention is accomplished in view of the aforementioned problem. The subject of the present invention is to provide an identification information recording apparatus and an identification information recording method for an optical disk capable of precisely recording identification information on an area where the identification information is recorded, and correctly reproducing the identification information from the area where the identification information is recorded.

In order to achieve the foregoing object, an identification information recording apparatus for an optical disk of the present invention comprises a turntable on which an optical disk is placed and that rotates the optical disk, and an optical pickup having a laser source for forming an optical spot on the optical disk placed on the turntable. The optical spot is elongated along the radial direction of the optical disk. The identification information recording apparatus further comprises a relative position changing member that changes a relative position between the optical pickup and the optical disk in the radial direction of the optical disk, an identification information recording member that records identification information on the optical disk with the edge portions of the elongated optical spot in the longitudinal direction overlapped with each other by controlling the emission of laser beam from the laser source and relative position between the optical pickup and the optical disk, and a light intensity distribution setting member that sets the light intensity distribution of the elongated optical spot so that the light intensity at the front side in the moving direction of the optical spot is lower than the light intensity at the rear side in the moving direction of the optical spot.

According to the feature of the present invention thus configured, the light intensity distribution of the elongated optical spot formed on the recording surface of the optical disk is set by the light intensity distribution setting member such that the light intensity at the front side in the moving direction of the optical pickup is set lower than the light intensity at the rear side in the moving direction of the optical pickup. Therefore, the reflection layer on the recording surface of the optical disk at the front side in the moving direction of the optical spot is gradually heated, whereby the amount of the molten reflection layer is small, and the rising solid portion is not so increased. When the position of the optical spot is moved and the area of the optical spot having the higher light intensity is positioned at the rising solid portion, the rising solid portion is melted. In this case, the melted reflection layer is removed around the optical spot due to the surface tension. Accordingly, it is prevented that the rising solid portion remains as a molten residue along the circumferential direction of the optical disk at the area where the identification information of the optical disk is to be recorded. As a result, the reproduction precision of the signal read out from the area where the identification information of the optical disk is to be recorded is enhanced, and consequently, the identification information recorded to the area where the identification information is to be recorded can correctly be reproduced.

Another feature of the present invention is such that the light intensity distribution setting member is configured by optical axis tilting member that tilts the optical axis of the laser beam emitted from the laser source in the radial direction of the optical disk with respect to the recording surface of the optical disk. The optical axis tilting member may be composed of optical axis tilt adjusting member for tilting the optical axis of the laser beam emitted from the laser source at an angle of 0.5 to 2.0° to the direction vertical to the recording surface of the optical disk. With this configuration, one focal position of the elongated optical spot formed on the recording surface of the optical disk in the longitudinal direction is deviated from the recording surface, and light intensity of the optical spot in the longitudinal direction whose focal position is deviated becomes lower than the light intensity at the other focal position of the optical spot in the longitudinal direction. Therefore, the optical axis of the laser beam is tilted to one direction in the radial direction of the optical disk to set the light intensity of the laser beam at the front side in the moving direction of the optical spot lower than the light intensity at the rear side in the moving direction, whereby the same effect as described above can be expected.

In this case, the optical axis tilting member may be composed of optical pickup tilting member that tilts the optical pickup in the radial direction of the optical disk. The optical pickup tilting means may be composed of, for example, a wedge-like spacer, wherein the spacer is interposed between the optical pickup and a support table for fixedly supporting the optical pickup in the identification information recording apparatus for tilting the optical pickup in the radial direction of the optical disk. With this configuration, the optical axis of the laser beam emitted from the laser source can be tilted in the radial direction of the optical disk to the recording surface of the optical disk with simple structure, with the result that the same effect as described above can be expected.

The present invention cannot only be embodied as a device invention, but also as a method invention.

BRIEF DESCRIPTION OF THE DRAWINGS

Various other objects, features and many of the attendant advantages of the present invention will be readily appreciated as the same becomes better understood by reference to the following detailed description of the preferred embodiment when considered in connection with the accompanying drawings, in which.

DESCRIPTION OF THE PREFERRED EMBODIMENT

Figure 1:
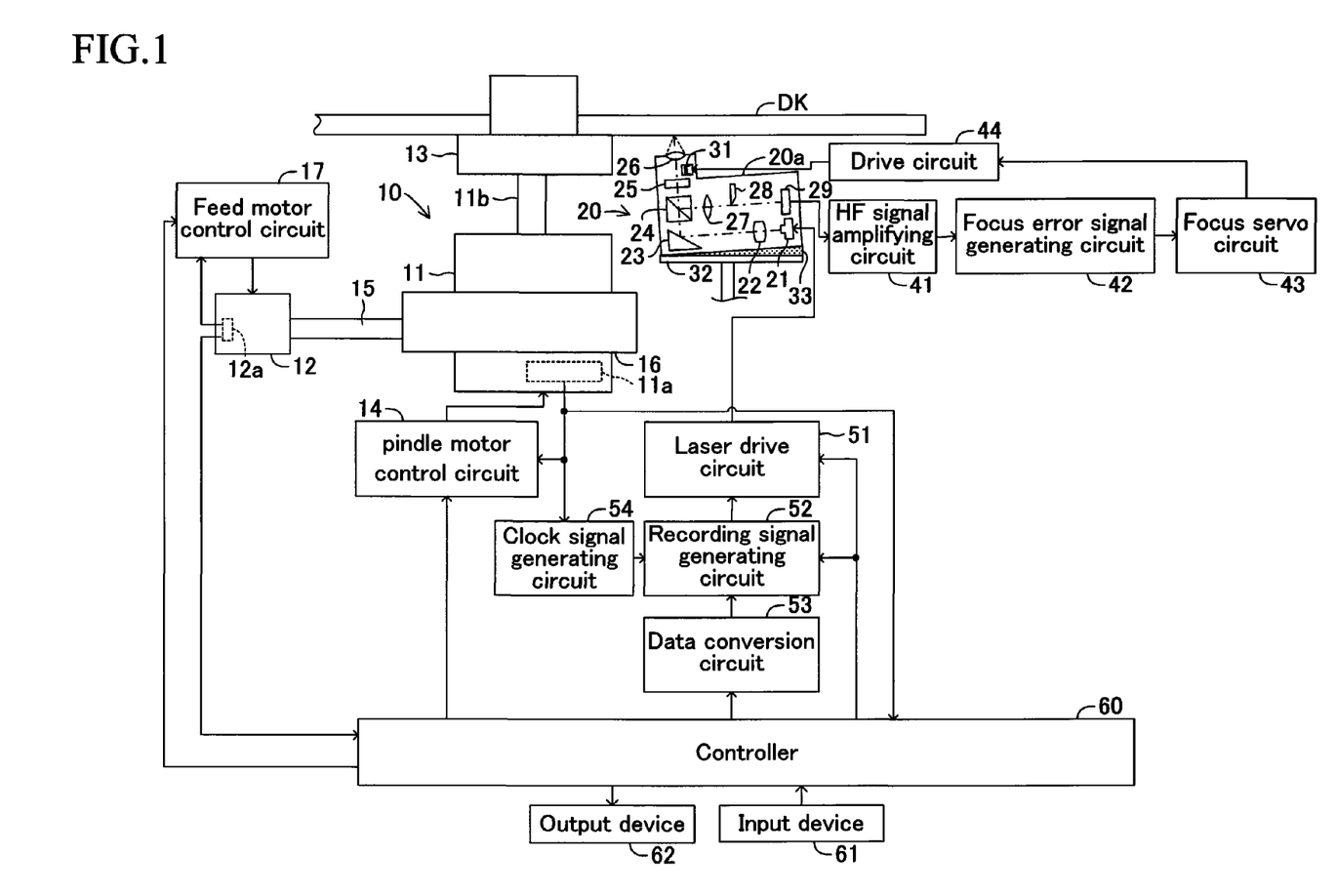
FIG. 1 is a schematic block diagram showing an overall of a media ID recording apparatus according to one embodiment of the present invention.
Figure 2A:
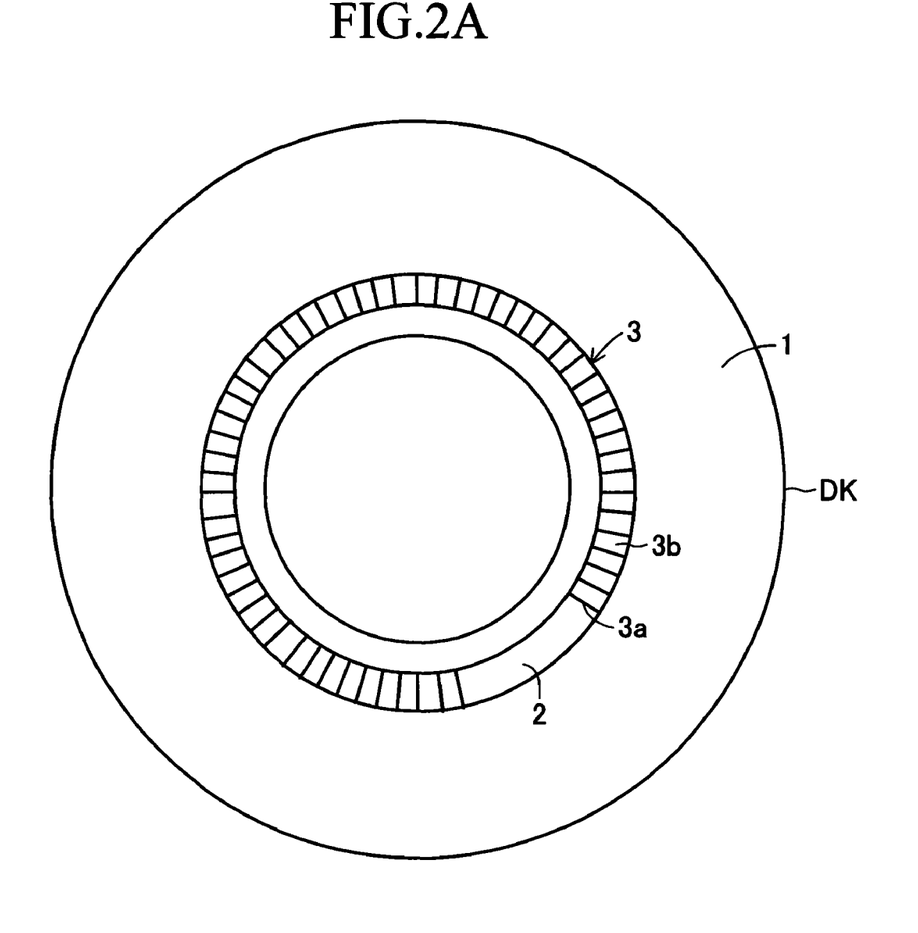
FIG. 2A is a top view of an optical disk showing a BCA of the optical disk.

An embodiment of an identification information recording apparatus according to the present invention will be explained with reference to the drawings. FIG. 1 is an overall schematic diagram of a media ID recording apparatus for recording a media ID to an optical disk DK such as Blu-ray Disk or HD-DVD. The media ID is identification information set and recorded for every optical disk in order to manage the optical disk during its manufacture and storage and during its distribution and sale. This media ID is, as shown in FIG. 2A, represented by a barcode 3 and recorded at a BCA (Burst Cutting Area) 2 (or NBCA (Narrow Burst Cutting Area)) annularly formed at the inner periphery of the recording area 1 of the optical disk DK so as to have a predetermined width. The media ID recording apparatus has a rotation drive device 10 for rotatably driving the optical disk DK and an optical pickup 20 that irradiates laser beam to the optical disk DK and receives reflection light caused by the irradiation from the optical disk DK.

The rotation drive device 10 has a spindle motor 11 and feed motor 12. The spindle motor 11 rotates a turntable 13 by rotating a rotation axis 11b. The optical disk DK is detachably mounted to the top surface of the turntable 13. An encoder 11a is incorporated into the spindle motor 11. The encoder 11a detects the rotation of the spindle motor 11 and outputs the rotation detecting signal, which indicates the rotation, to a controller 60. The rotation detecting signal is composed of an index signal INDEX that is generated every time the rotating position of the turntable 13 (optical disk DK) reaches one reference rotating position, and a pulse train signal in which high-level signal and low-level signal are repeated for each predetermined rotation microangle, and composed of an A-phase signal $\phi_A$ and B-phase signal $\phi_B$, both phases being shifted from each other by $\pi/2$. Of these rotation detecting signals, the index signal INDEX is used for detecting the number of revolution (e.g., one revolution) of the spindle motor 11, i.e., of the optical disk DK at the controller 60, while the pulse train signals $\phi_A$ and $\phi_B$ are used for detecting the rotational speed of the spindle motor 11, i.e., of the optical disk DK at a spindle motor control circuit 14.

The rotation of the spindle motor 11 is controlled by the spindle motor control circuit 14. The spindle motor control circuit 14 is controlled by the later-described controller 60. The spindle motor control circuit 14 controls the rotation of the spindle motor 11 such that the optical disk DK always rotates at a constant linear velocity by using the rotation detecting signal supplied from the encoder 11a. The feed motor 12 displaces the spindle motor 11, support member 16 for supporting the spindle motor 11, and the turntable 13 in the radial direction of the optical disk DK due to its rotation through a screw mechanism composed of a screw rod 15 and a nut (not shown).

The feed motor 12 also has an encoder 12a incorporated therein. The encoder 12a is configured by the same manner as the encoder 11a. It detects the rotation of the feed motor 11 and outputs the rotation detecting signal, which indicates the rotation of the feed motor 11, to a feed motor control circuit 17 and the controller 60. The feed motor control circuit 17 controls the rotation of the feed motor 12 by using the rotation detecting signal outputted from the encoder 12a according to the instruction from the controller 60, thereby controlling the displacement of the spindle motor 11, turntable 13 and support member 16 toward the radial direction of the optical disk DK.

The optical pickup 20 is an optical device that irradiates laser beam to the optical disk DK such as Blu-ray Disk or HD-DVD for recording the media ID. The optical pickup 20 has a laser source 21, collimator lens 22, riser mirror 23, polarizing beam splitter 24, ¼ wave plate 25, objective lens 26, convex lens 27, knife-edge 28, photodetector 29, and focus actuator 31, those of which are mounted to a casing 20a. The laser source 21 emits recording laser beam (laser beam having high emitting power) for recording the media ID to the optical disk DK and forms an elongated optical spot along the radial direction of the optical disk DK. The focus actuator 31 drives the objective lens 26 toward the optical axis of the laser beam (direction vertical to the disk surface of the optical disk DK) for slightly moving the optical spot toward the optical axis in order that the optical spot follows the surface of the optical disk DK.

The optical pickup 20 converges the recording laser beam emitted from the laser source 21 on the recording surface of the optical disk DK through the collimator lens 22, riser mirror 23, polarizing beam splitter 24, ¼ wave plate 25 and objective lens 26, to thereby form the optical spot elongated in the radial direction of the optical disk DK. The reflection light from the elongated optical spot formed on the optical disk DK is directed and received by the photodetector 29 through the objective lens 26, ¼ wave plate 25, polarizing beam splitter 24, convex lens 27 and knife-edge 28. The photodetector 29 is composed of a two-divided light-receiving device including two light-receiving devices both having the same rectangular shape and divided with a parting line. The respective light-receiving devices output the detection signals A and B respectively, which are in proportion to the light-receiving amount, as light-receiving signals. The convex lens 27, knife-edge 28 and photodetector 29 constitute an optical system for generating a focus error signal by a knife-edge method.

Figure 3A:
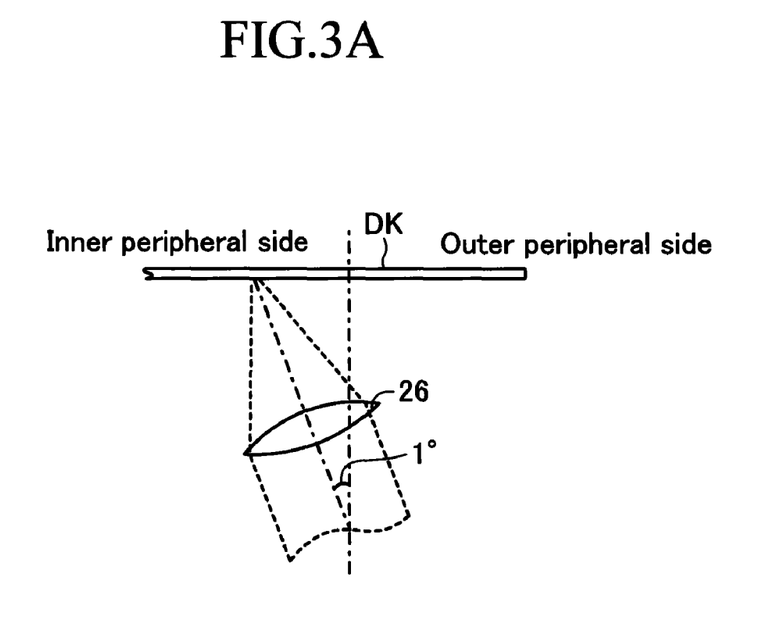
FIG. 3A is a schematic illustration showing a relationship between an optical axis of laser beam and the optical disk according to one embodiment of the present invention.

The optical pickup 20 is fixed via a spacer 33 to a support table 32 that has a top surface parallel to the recording surface of the optical disk DK placed on the turntable 13. The support table 32 is provided at the position opposite to the optical disk DK in the media ID recording apparatus. The support table 32 is adjusted to fixedly support the optical pickup 20 in such a manner that the optical axis of the laser beam emitted from the laser source 21 and directed to the recording surface of the optical disk DK via the objective lens 26 is vertical to the recording surface of the optical disk DK. The spacer 33 is formed into a wedge. It is interposed between the optical pickup 20 and the support table 32 for tilting the optical pickup 20 fixed to the support table 32 toward the radial direction of the optical disk DK. In this embodiment, the optical pickup 20 is tilted toward the inner periphery (left side in the figure) of the optical disk DK at an angle of 1.0° to the top surface of the support table 32. Therefore, as shown in FIG. 3A, the optical axis of the laser beam emitted from the optical pickup 20 is tilted toward the inner periphery (left side in the figure) in the radial direction of the optical disk DK at an angle of 1.0° to the direction vertical to the recording surface of the optical disk DK. Accordingly, the optical spot formed on the recording surface of the optical disk DK takes an elongated shape that is flat toward the outer periphery in the radial direction of the optical disk DK.

Figure 3B:
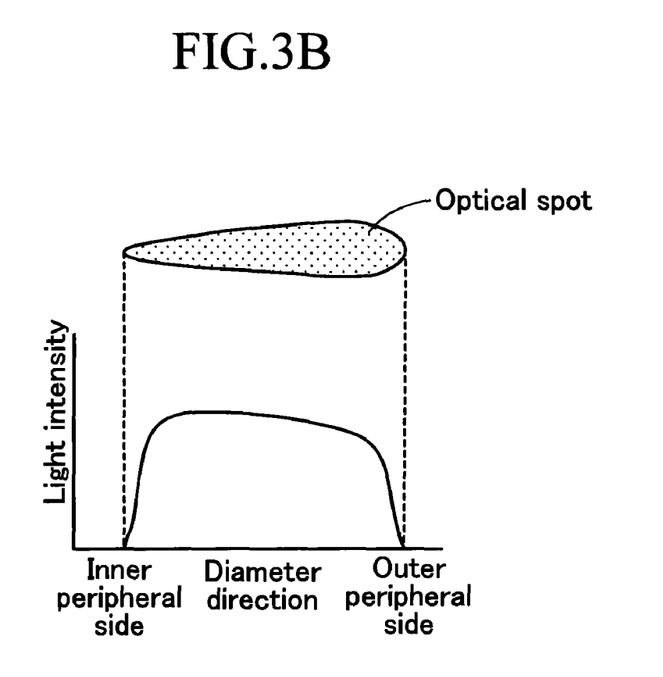
FIG. 3B is a schematic illustration showing a light intensity distribution of an optical spot according to one embodiment of the present invention.

The light intensity distribution of the optical spot formed on the recording surface of the optical disk DK is set such that the light intensity of the optical spot at the outer periphery in the radial direction of the optical disk DK becomes smaller than the light intensity at the inner periphery in the radial direction of the optical disk DK, as shown in FIG. 3B. Specifically, the optical pickup 20 is tilted to tilt the optical axis of the laser beam emitted from the laser source 21, whereby the focal position of the optical spot at the inner periphery in the radial direction of the optical disk DK is matched to the recording surface of the optical disk DK and the focal position of the optical spot at the outer periphery in the radial direction of the optical disk DK is shifted from the recording surface of the optical disk DK. Therefore, the light intensity of the optical spot at the outer periphery in the radial direction of the optical disk DK becomes smaller than the light intensity of the optical spot at the inner periphery in the radial direction of the optical disk DK. It is to be noted that, in FIG. 1 and FIGS. 3A and 3B, the tilting state of the objective lens 26, spacer 33, and optical pickup 20 is exaggeratively represented in order to clarify the state of the tilting of the optical axis of the laser beam. The optical pickup 20 is fixed to the support table 32 with a screw not shown.

An HF signal amplifying circuit 41 is connected to the photodetector 29. The HF signal amplifying circuit 41 amplifies the respective detecting signals A and B outputted from the photodetector 29, and outputs the resultant to a focus error signal generating circuit 42. The focus error signal generating circuit 42 generates a focus error signal with a knife-edge method by using the detecting signals A and B outputted from the photodetector 29 through the HF signal amplifying circuit 41, and outputs the resultant to a focus servo circuit 43. The focus servo circuit 43 generates a focus servo signal on the basis of the focus error signal, and controls and drives the focus actuator 31 through a drive circuit 44 by using the focus servo signal in order to displace the objective lens 26 in the optical axis direction to make a focus-servo control. Accordingly, the focal point of the laser beam, i.e., the optical spot, is controlled to follow the surface of the optical disk DK.

A laser drive circuit 51 for driving the laser source 21 is connected to the laser source 21 of the optical pickup 20. The laser drive circuit 51 drives the laser source 21 in accordance with the instruction from the controller 60, and emits recording laser beam from the laser source 21. Further, the laser drive circuit 51 turns on or off the laser source 21 based upon the recording signal outputted from a recording signal generating circuit 52. The recording signal generating circuit 52 generates the recording signal for recording the media ID to the optical disk DK in accordance with the instruction from the controller 60, and outputs the resultant to the laser drive circuit 51. Specifically, the recording signal generating circuit 52 temporarily stores barcode data outputted from a data conversion circuit 53, and modulates the stored barcode data with the use of a clock signal outputted from a clock signal generating circuit 54 in accordance with the instruction from the controller 60 to thereby generate the recording signal.

Figure 2B:
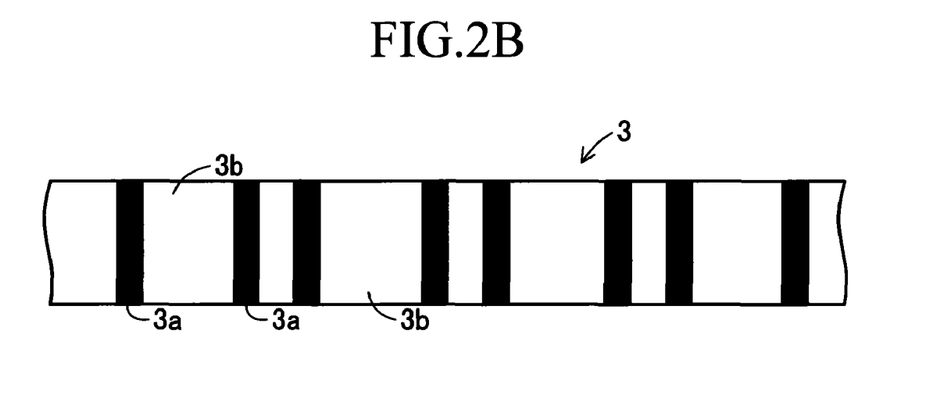
FIG. 2B is a view showing the recording state of the media ID represented by a barcode with the BCA linearly represented.

The barcode data is for representing the media ID with a barcode. It is a data representing the respective arrangement states of a bar section 3a and a space section 3b between the bar sections 3a of the barcode 3 shown in FIG. 2B. Accordingly, the recording signal generating circuit 52 modulates the barcode data into a pulse train signal having length of pulses for forming the bar section 3a and the space section 3b of the barcode, thereby generating the recording signal (e.g., the length of the bar section 3a is represented by 10 pulses of the clock signal, and the total length of the bar section 3a and the space section 3b is represented by an integral multiple of 31 pulses of the clock signal).

The data conversion circuit 53 converts the signal that is outputted from the controller 60 and indicates the media ID set for every optical disk DK into the barcode data corresponding to this signal, and outputs the resultant to the recording signal generating circuit 52. Further, the clock signal generating circuit 54 generates the clock signal, which is a reference for the generation of the recording signal by the recording signal generating circuit 52, by using the rotation detecting signal outputted from the encoder 11a, and outputs the clock signal to the recording signal generating circuit 52. The clock signal is, for example, a pulse signal having 144000 pulses per rotation cycle of the optical disk DK.

The controller 60 is a microcomputer composed of a CPU, ROM, RAM, hard disk, and the like. The controller 60 records the media ID by the execution of a program, not shown, in accordance with the instruction from an input device 61 made of a keyboard, mouse, and the like, and indicates an output device 62 composed of a CRT (or liquid crystal display), printer, and the like to appropriately display the process of the execution of the program and the result of the execution. Connected to this controller 60 are the spindle motor control circuit 14, feed motor control circuit 17, laser drive circuit 51, recording signal generating circuit 52, and data conversion circuit 53 in order to control the actuations thereof.

The operation of the embodiment thus configured will be explained. An operator turns on a power source switch (not shown) to start the actuations of the various circuits of the media ID recording apparatus including the controller 60. Then, the operator places the optical disk DK, which is a subject to which the media ID is recorded, on the turntable 13, and fixes the optical disk DK on the turntable 13. Next, the operator operates the input device 61 to give an instruction of the recording of the media ID to the controller 60. Upon the instruction of the recording of the media ID, the operator instructs the media ID that is to be recorded to the optical disk DK to the controller 60 through the input device 61. In response to the instruction of the recording of the media ID, the controller 60 starts the recording of the media ID to the optical disk DK by the execution of the program (not shown) relating to the recording of the media ID. Although the reflection layer formed on the recording surface of the optical disk DK in this embodiment is made of silver alloy, it may be made of another material, e.g., aluminum alloy.

Firstly, the controller 60 positions the optical pickup 20 to the media ID recording start position on the optical disk DK. This media ID recording start position is a position standardized for each type of the optical disk DK. In this embodiment, the position in the radial direction at the innermost periphery in the BCA (Burst Cutting Area) formed at the innermost peripheral portion of the optical disk DK is set beforehand to the controller 60 as the media ID start position. Accordingly, the controller 60 instructs to the feed motor control circuit 17 the position in the radial direction at the innermost periphery side in the BCA formed at the optical disk DK. In response to this instruction, the feed motor control circuit 17 controls the rotation of the feed motor 12 to position the optical disk DK to the position in the radial direction. With this operation, the optical disk DK is positioned such that the optical axis of the optical pickup 20, i.e., the optical spot formed through the objective lens 26, is located at the position at the innermost periphery side in the BCA in the radial direction.

Subsequently, the controller 60 outputs the signal indicating the media ID inputted by the operator to the data conversion circuit 53. The data conversion circuit 53 converts the signal indicating the media ID into the barcode data corresponding to the media ID, and outputs the resultant to the recording signal generating circuit 52. The recording signal generating circuit 52 stores the barcode data outputted from the data conversion circuit 53. Further, the controller 60 starts the actuation of the spindle motor control circuit 14 to rotate the optical disk DK with a constant linear speed. In this case, the controller 60 gives an instruction, to the spindle motor control circuit 14, of the number of revolution (e.g., 300 to 3000 rpm for Blu-ray Disk, HD-DVD) for the recording of the media ID.

Then, the controller 60 starts the recording of the media ID onto the optical disk DK. In this case, the controller 60 instructs the feed motor control circuit 17, laser drive circuit 51, and recording signal generating circuit 52 to operate in synchronism with the index signal INDEX outputted from the encoder 11a of the spindle motor 11. Specifically, the controller 60 gives an instruction of the moving direction and moving speed to the feed motor control circuit 17. In response to this instruction, the feed motor control circuit 17 controls the rotation of the feed motor 12 in order that the optical spot moves in the instructed moving direction with the instructed moving speed. In this embodiment, by the rotation of the feed motor 12 controlled by the feed motor control circuit 17, relative position between the optical pickup 20 and the optical disk DK changes in the radial direction of the optical disk DK so as to move the optical spot in the radial direction of the optical disk DK. Therefore, the feed motor 12 and the feed motor control circuit 17 are relative position changing member in the present invention.

Figure 4:
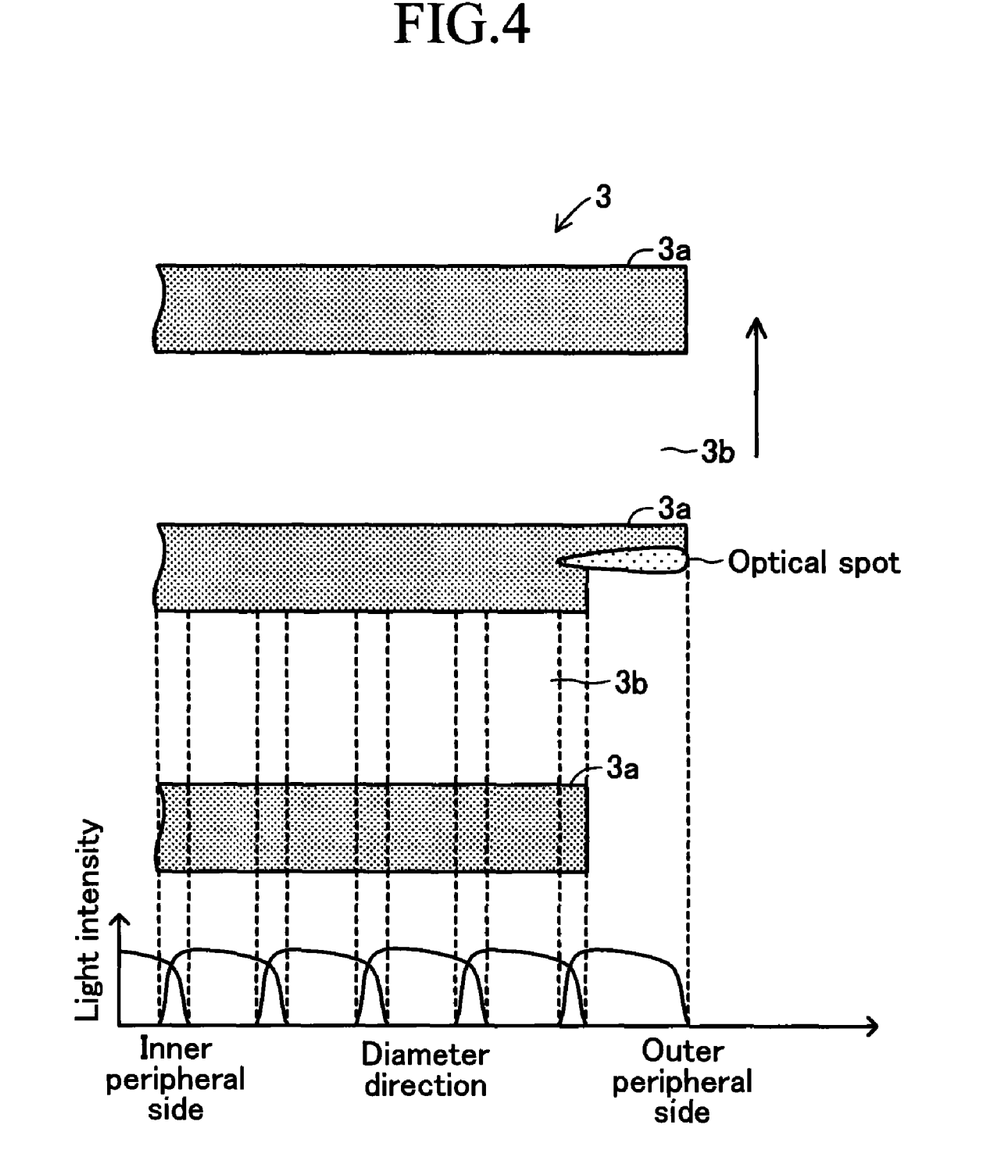
FIG. 4 is a schematic illustration showing an optical spot upon recording a bar section of a barcode to the optical disk and a state of a light intensity distribution of the optical spot.

In this case, as shown in FIG. 4, the controller 60 moves the optical spot such that a part of the elongated optical spot, formed on the optical disk DK, at the inner periphery side in the radial direction of the optical disk DK, i.e., the trailing end of the optical spot in the longitudinal direction, overlaps the leading end of the bar section 3a of the barcode 3 that has already been formed. Accordingly, the controller 60 calculates the moving speed by dividing the difference between the length of the optical spot in the longitudinal direction and the overlapping amount of the optical spot at the trailing end in the longitudinal direction by the rotation cycle of the optical disk DK. The length of the optical spot in the longitudinal direction and the overlapping amount of the optical spot at the trailing end are set beforehand to the controller 60 by the operator. The rotation cycle of the optical disk DK is a reciprocal number of revolution frequencies of the optical disk DK set beforehand to the controller 60 by the operator.

The controller 60 instructs the recording signal generating circuit 52 to generate the recording signal. In response to this instruction, the recording signal generating circuit 52 generates the recording signal by making the stored barcode data in synchronism with the clock signal outputted from the clock signal generating circuit 54. Moreover, the controller 60 instructs the recording laser drive circuit 51 to emit the laser beam from the laser source 21. In this case, the recording signal is outputted from the recording signal generating circuit 52 to the recording laser drive circuit 51, whereby the recording laser drive circuit 51 turns on or off the laser source 21 in accordance with the recording signal. Accordingly, the recording of the media ID is started from the recording start position in the radial direction in the BCA of the optical disk DK. In this embodiment, the controller 60 is an identification information recording member that records identification information (media ID) on the optical disk DK with the edge portions of the elongated optical spot in the longitudinal direction overlapped with each other by controlling the emission of laser beam from the laser source 21 and relative position between the optical pickup 20 and the optical disk DK.

Figure 5A:
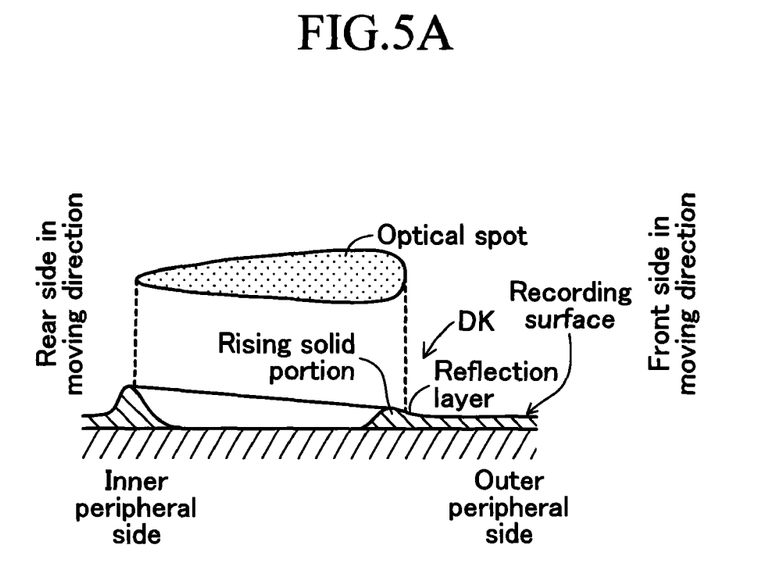
FIGS. 5A and 5B are schematic illustrations for explaining a molten state of a reflection layer according to one embodiment of the present invention when the optical spot is formed on the recording surface of the optical disk.
Figure 5B:
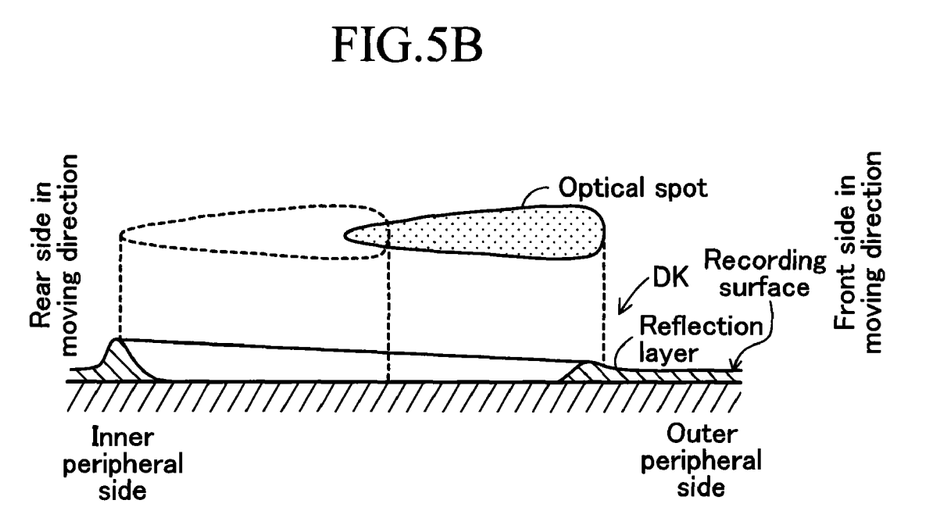

In this case, as shown in FIG. 5A, the optical spot on the recording surface of the optical disk DK is formed into a shape that is widened toward the front side in the moving direction of the optical spot from the rear side in the moving direction of the optical spot, wherein the light intensity of the optical spot at the front side in the moving direction is smaller than the light intensity at the rear side in the moving direction. Therefore, the reflection layer on the recording surface of the optical disk at the front side in the moving direction of the optical spot is gradually heated, whereby the amount of the molten reflection layer is small, and the rising solid portion is not so increased. When the optical spot moves to the outer periphery of the optical disk DK due to one rotation of the optical disk DK, the area of the optical spot having the higher light intensity is positioned at the rising solid portion as shown in FIG. 5B. Accordingly, the rising solid portion is melted, and the melted reflection layer is removed around the optical spot due to the surface tension. Then, as shown in FIG. 4, the barcode 3 is recorded to the BCA of the optical disk DK, as the position of the optical spot moves toward the outer periphery in the radial direction of the optical disk DK in accordance with the rotation of the optical disk DK (in the direction shown by an arrow in the figure).

Specifically, the barcode 3 composed of the bar section 3a and the space section 3b having a predetermined width (e.g., the length of the bar section 3a is represented by 10 pulses of the clock signal, and the total length of the bar section 3a and the space section 3b is represented by an integral multiple of 31 pulses of the clock signal) is recorded from the recording start position in the radial direction in the BCA of the optical disk DK toward the circumferential direction of the optical disk DK. With one rotation of the optical disk DK, the bar section 3a corresponding to the length of the optical spot in the longitudinal direction is radially formed in the radial direction of the optical disk DK. In this case, the optical spot moves, for one rotation of the optical disk DK, such that the trailing end of the optical spot in the moving direction overlaps the leading end of the bar section 3a of the barcode 3, which has already been formed, with the above-mentioned overlapping amount. Then, the barcode 3 of the same pattern composed of the bar section 3a and the space section 3b having the predetermined width is recorded to the BCA. It is to be noted that, in FIG. 4, the arrow indicates the direction of rotation of the optical disk DK. The optical spot moves from the upper bar section 3a toward the lower bar section 3a, whereby the barcode 3 having the pattern composed of the bar section 3a and the space section 3b having the predetermined width is successively formed along the radial direction of the optical disk DK.

During the recording of the media ID to the optical disk DK, the laser beam emitted from the laser source 21 is reflected by the optical disk DK, and then, received by the photodetector 29. The laser beam received by the photodetector 29 is converted into the detecting signals A and B corresponding to the light-receiving quantity, and outputted to the HF signal amplifying circuit 41 to be used for the focus-servo control of the objective lens 26 by the focus error signal generating circuit 42, focus servo circuit 43, and drive circuit 44.

The controller 60 calculates the position in the radial direction on the optical disk DK on which the optical spot is formed by using the rotation detecting signal outputted from the encoder 12a of the feed motor 12, and performs a recording process of the media ID until the position in the radial direction reaches the recording end position of the media ID. The media ID recording end position is also a position standardized for each type of the optical disk DK, like the above-mentioned media ID recording start position. In this embodiment, the position in the radial direction at the outermost peripheral side in the BCA (Burst Cutting Area) formed at the innermost peripheral portion of the optical disk DK is set beforehand to the controller 60 as the media ID recording end position. When the position on the optical disk DK in the radial direction on which the optical spot is to be formed reaches the recording end position, the controller 60 stops the actuations of various circuits. Specifically, it stops the actuation of the spindle motor control circuit 14 to stop the rotation of the optical disk DK, and stops the actuation of the feed motor control circuit 17 to stop the feed servo control of the optical disk DK. Further, the controller 60 allows the recording laser drive circuit 51 to stop its actuation to thereby stop the emission of laser beam from the laser source 21. Thus, the media ID represented by the barcode is recorded to the BCA of the optical disk DK.

Subsequently, the operator removes the optical disk DK having the media ID recorded thereon from the turntable 13. Thus, the recording operation of the media ID is completed. In case where the media ID is recorded on another optical disk DK, a new optical disk DK is placed and fixed onto the turntable 13, and the media ID is recorded on the new optical disk DK by the same manner as described above.

As understood from the explanation of the aforementioned operation, when the media ID is recorded to the BCA of the optical disk DK, the light intensity distribution of the elongated optical spot formed on the recording surface of the optical disk DK is set such that the light intensity at the front side in the moving direction of the optical spot is made smaller than the light intensity at the rear side in the moving direction. Therefore, the reflection layer on the recording surface of the optical disk at the front side in the moving direction of the optical spot is gradually heated, whereby the amount of the molten reflection layer is small, and the rising solid portion is not so increased. When the position of the optical spot is moved and the optical spot having the higher light intensity is formed on the heated reflection layer, the rising solid portion is melted, and the melted reflection layer is removed around the optical spot due to the surface tension. Accordingly, it is prevented that the rising solid portion remains as a molten residue in the BCA of the optical disk DK. As a result, the reproduction precision of the signal read out from the BCA of the optical disk is enhanced, and consequently, the media ID recorded to the BCA can correctly be reproduced.

Figure 6A:
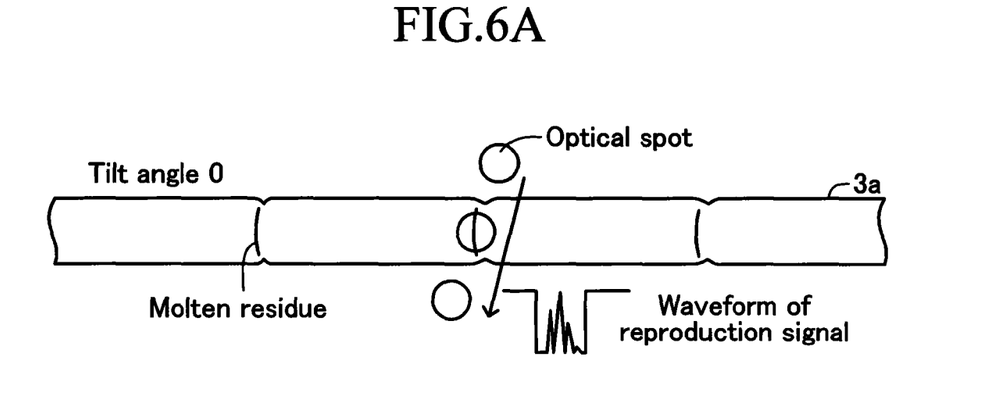
FIGS. 6A to 6C are schematic illustrations for explaining a state of a reproduction signal to the tilt angle of the optical axis of the laser beam.
Figure 7A:
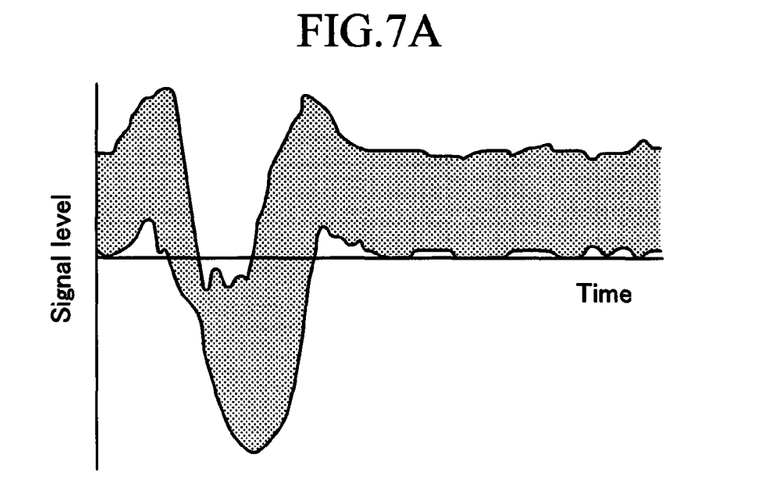
FIG. 7A is a waveform chart in which plural reproduction signals are shown as overlapped with each other in case where the optical axis of the laser beam is not tilted.

In case where the optical axis of the laser beam emitted from the laser source 21 is not tilted (tilt angle: 0°) as shown in FIG. 6A and FIG. 7A, a molten residue is generated in the bar section 3a, and when the optical spot used for the reproduction passes on the molten residue, the low-level signal in the reproduction signal becomes unstable. FIG. 7A shows a waveform chart in which plural actual low-level signals in case where the optical axis of the laser beam emitted from the laser source 21 is not tilted (tilt angle: 0°) are displayed on an oscilloscope as superimposed. In the low-level signals shown in FIG. 7A, the amplitude is disturbed at the vicinity of the bottom of the low-level signal, providing an unstable waveform.

Figure 6B:
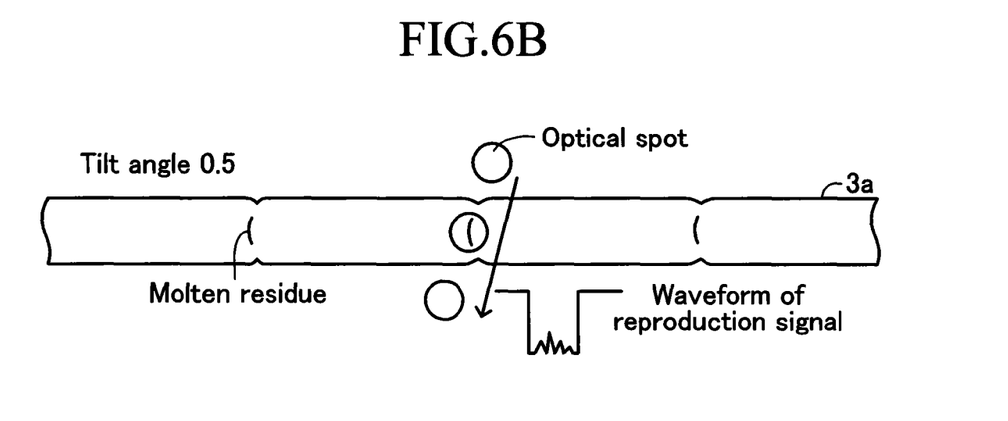
Figure 6C:
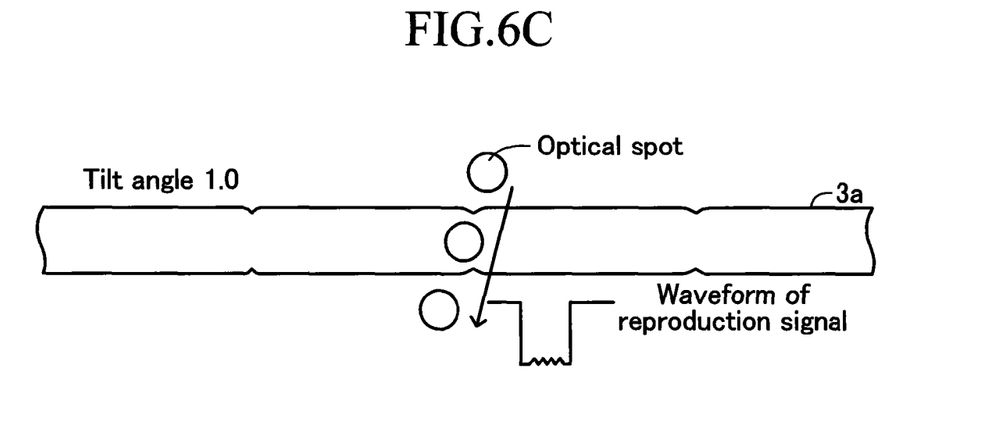
Figure 7B:
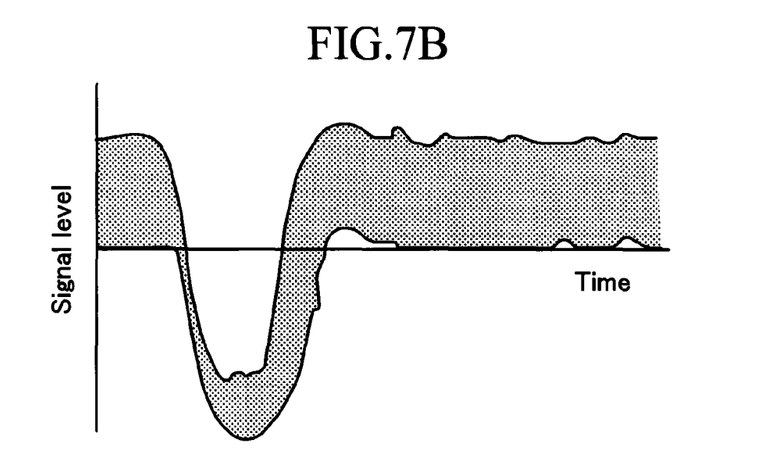
FIG. 7B is a waveform chart in which plural reproduction signals are shown as overlapped with each other in case where the optical axis of the laser beam is tilted.

On the other hand, in case where the optical axis of the laser beam emitted from the laser source 21 is tilted at an angle of 0.5° to the direction vertical to the recording surface of the optical disk DK as shown in FIG. 6B, the amount of the molten residue generated in the bar section 3a is decreased, so that the low-level signal in the reproduction signal reproduced by the pass of the optical spot on the molten residue becomes stable. In case where the optical axis of the laser beam emitted from the laser source 21 is tilted at an angle of 1.0° to the direction vertical to the recording surface of the optical disk DK as shown in FIG. 6C and FIG. 7B, the molten residue is not generated in the bar section 3a, so that the low-level signal in the reproduction signal becomes more stable. FIG. 7B shows a waveform chart in which plural actual low-level signals in case where the optical axis of the laser beam emitted from the laser source 21 is tilted at an angle of 1.0° to the direction vertical to the recording surface of the optical disk DK are displayed on an oscilloscope as superimposed. In the low-level signals shown in FIG. 7B, the disturbance of the amplitude at the vicinity of the bottom of the low-level signal is smaller, compared to the low-level signals shown in FIG. 7A, so that the low-level signals shown in FIG. 7B have a relatively stable waveform. Thus, the media ID recorded to the BCA of the optical disk DK can correctly be reproduced.

The optical pickup 20 is tilted toward the inner peripheral side of the optical disk DK in the radial direction in order to set the light intensity of the optical spot at the front side in the moving direction smaller than the light intensity at the rear side in the moving direction. Accordingly, the optical axis of the laser beam emitted from the laser source 21 can be tilted to the recording surface of the optical disk DK with a simple configuration, whereby the light intensity of the optical spot at the front side in the moving direction can be set smaller than the light intensity at the rear side in the moving direction.

Further, the present invention is not limited to the aforementioned embodiment, and various modifications are possible without departing from the spirit of the present invention.

In the aforementioned embodiment, the optical pickup 20 is tilted toward the inner peripheral side of the optical disk DK in the radial direction (left side in the figure) by using the spacer 33. Therefore, the spacer 33 is an optical axis tilting member that tilts the optical axis of the laser beam emitted from the laser source 21 toward the radial direction of the optical disk DK to the recording surface of the optical disk DK. However, the invention is not limited thereto so long as the light intensity of the optical spot at the front side in the moving direction can be set smaller than the light intensity at the rear side in the moving direction. Specifically, the optical pickup 20 may be tilted toward the outer peripheral side of the optical disk DK in the radial direction (right side in the figure) by using the spacer 33. In this case, a focus servo control is carried out in such a manner that the focal position of the optical spot at the inner periphery in the radial direction of the optical disk DK is matched to the recording surface of the optical disk DK and the focal position of the optical spot at the outer periphery in the radial direction of the optical disk DK is shifted from the recording surface of the optical disk DK. With this configuration, the effect same as the aforementioned embodiment can be expected.

In the aforementioned embodiment, the optical pickup 20 is fixed to the support table 32 via the spacer 33 in order to tilt the optical axis of the laser beam emitted from the laser source 21. However, the present invention is not limited thereto so long as the optical axis of the laser beam can be tilted. For example, the top surface of the support table 32 or the support table 32 itself is tilted, and this support table 32 is mounted in the media ID recording apparatus, wherein the optical pickup 20 may be directly fixed to the top surface of the tilted support table 32. Further, a support table may be employed in which the angle of the top surface thereof may optionally be set within a predetermined range (e.g. goniostage, inclined stage, tilt stage). In this case, the adjustment of the angle of the top surface of the support table 32 may be manually carried out by an operator. Alternately, an electric motor may be provided to an adjusting mechanism for changing the angle of the top surface of the support table 32, whereby the angle of the top surface of the support table 32 may be adjusted through the control of the rotation of the electric motor by the controller 60.

Figure 8:
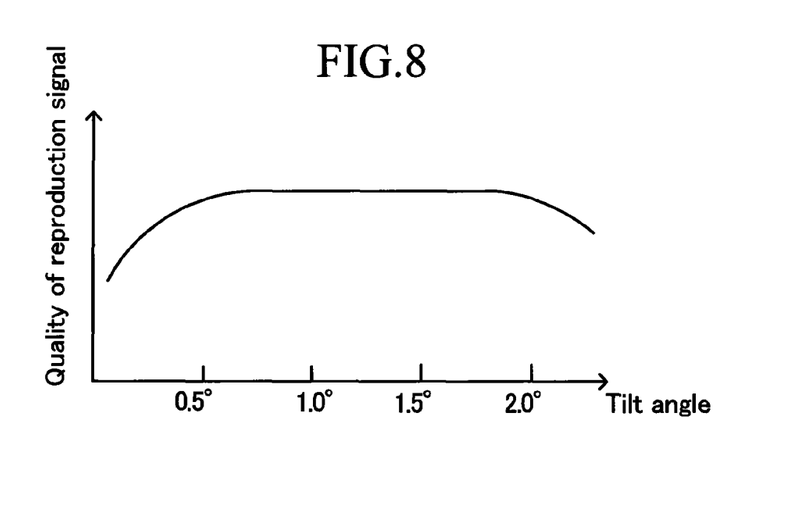
FIG. 8 is a graph showing a quality of the reproduction signal to the tilt angle of the optical axis of the laser beam.

In the aforementioned embodiment, the optical axis of the laser beam emitted from the laser source 21 is tilted at an angle of 1.0° to the direction vertical to the recording surface of the optical disk DK. However, the present invention is not limited thereto so long as the light intensity of the optical spot at the front side in the moving direction can be set smaller than the light intensity at the rear side in the moving direction. The tilt angle of the optical axis of the laser beam is appropriately set depending upon the material of the reflection layer, emission power of the laser source 21, etc. The experiment carried out by the inventor of the present invention shows that, when the optical axis of the laser beam emitted from the laser source 21 is tilted within the range of 0.5° to 2.0° to the direction vertical to the recording surface of the optical disk DK, the media ID can satisfactorily be recorded as shown in FIG. 8. Notably, FIG. 8 has an axis of abscissa representing the tilt angle of the optical axis of the laser beam emitted from the laser source 21 to the direction vertical to the recording surface of the optical disk DK and an axis of ordinate representing the quality of the reproduction signal reproduced from the BCA.

In the aforementioned embodiment, the optical axis of the laser beam emitted from the laser source 21 is tilted in order to set the light intensity of the optical spot at the front side in the moving direction smaller than the light intensity at the rear side in the moving direction by using the spacer 33. Therefore, the spacer 33 is a light intensity distribution setting member that sets the light intensity distribution of the elongated optical spot so that the light intensity at the front side in the moving direction of the optical spot is lower than the light intensity at the rear side in the moving direction of the optical spot. However, the present invention is not limited thereto. For example, the light intensity of the optical spot at the front side in the moving direction may be made smaller than the light intensity at the rear side in the moving direction by using an optical device or optical apparatus that can set the light intensity distribution of the optical spot formed from the laser beam emitted from the laser source 21.

In the aforementioned embodiment, the optical pickup 20 is tilted in order to tilt the optical axis of the laser beam emitted from the laser source 21. However, the present invention is not limited thereto so long as the optical axis of the laser beam can be tilted. For example, the optical devices in the optical pickup 20, e.g., laser source 21, objective lens 26, etc., may be tilted. Alternately, the optical disk DK may be tilted to the optical axis of the laser beam emitted from the laser source 21.

What is claimed is:

1. An identification information recording apparatus for recording identification information on an optical disk comprising:
   a turntable on which an optical disk is placed and that rotates the optical disk;
   an optical pickup having a laser source that emits a laser beam that forms an optical spot on the optical disk placed on the turntable for melting a reflection layer formed on the optical disk, said optical spot elongated along a radial direction of the optical disk;
   a relative position changing member that changes a relative position between the optical pickup and the optical disk in the radial direction of the optical disk placed on the turntable;
   an identification information recording member that records the identification information on the optical disk by controlling the emission of the laser beam from the laser source and the relative position between the optical pickup and the optical disk, the identification information recording member controlling the emission of the laser beam from the laser source to have an end portion of the elongated optical spot in the radial direction overlap a section of the identification information already formed; and
   a light intensity distribution setting member that sets a light intensity distribution of the elongated optical spot,
   wherein said light intensity distribution member comprises an optical axis tilting member that tilts the optical axis of the laser beam emitted from the laser source at an angle between and including 1.0° and 2.0° in the radial direction of the optical disk, and sets the light intensity distribution of the elongated optical spot so that a light intensity of the optical spot at a front side in a moving direction of the optical spot is lower than a light intensity of the optical spot at a rear side in the moving direction of the optical spot, said moving direction being a direction in which the optical spot moves by changing the relative position between the optical pickup and the optical disk in the radial direction of the optical disk by the relative position changing member.

2. An identification information recording apparatus according to claim 1, wherein the optical axis tilting member tilts the optical axis of the laser beam emitted from the laser source at an angle less than or equal to 2.0°.

3. An identification information recording apparatus according to claim 1, wherein the optical axis tilting member comprises an optical pickup tilting member that tilts the optical pickup in the radial direction of the optical disk.

4. An identification information recording apparatus according to claim 2, wherein the optical axis tilting member comprises an optical pickup tilting member that tilts the optical pickup in the radial direction of the optical disk.

5. An identification information recording apparatus according to claim 3, further comprising; a support table provided at a position opposite to the optical disk which supports the optical pickup so as to cause the laser beam to be emitted toward a recording surface of the optical disk.

6. An identification information recording apparatus according to claim 5, wherein the optical axis tilting member is a spacer formed into a wedge and interposed between the optical pickup and the support table for tilting the optical pickup fixed to the support table in the radial direction of the optical disk.

7. An identification information recording apparatus according to claim 4, further comprising; a support table provided at a position opposite to the optical disk which supports the optical pickup so as to cause the laser beam to be emitted toward a recording surface of the optical disk.

8. An identification information recording apparatus according to claim 7, wherein the optical axis tilting member is a spacer formed into a wedge and interposed between the optical pickup and the support table for tilting the optical pickup fixed to the support table in the radial direction of the optical disk.

9. An identification information recording method for an optical disk that is applied to an identification information recording apparatus for an optical disk comprising the steps of:
   placing an optical disk on a turntable and rotating the optical disk;
   forming an elongated optical spot on the optical disk by emitting a laser beam toward the optical disk from an optical pickup having a laser source;
   moving the optical spot in a radial direction of the optical disk;
   recording identification information on the optical disk by controlling the emitting of the laser beam to have an end portion of the elongated optical spot in the radial direction overlap a section of the identification information already formed; and
   setting a light intensity distribution of the elongated optical spot so that a light intensity of the optical spot at a front side in the moving radial direction of the optical spot is lower than a light intensity of the optical spot at a rear side in the moving radial direction of the optical spot by tilting the optical axis of the laser beam emitted from the laser source at an angle between and including 1.0° and 2.0°.

10. An identification information recording method for an optical disk according to claim 9, wherein the optical axis of the laser beam emitted from the laser source is tilted at an angle less than or equal to 2.0°.

11. An identification information recording method for an optical disk according to claim 9, wherein the optical pickup is tilted in the radial direction of the optical disk.

12. An identification information recording method for an optical disk according to claim 10, wherein the optical pickup is tilted in the radial direction of the optical disk.

13. An identification information recording apparatus for an optical disk according to claim 1, wherein said front side in the moving direction of the optical spot is an outer peripheral side in the radial direction of the optical disk, and said rear side in the moving direction of the optical spot is an inner peripheral side in the radial direction of the optical disk.

14. An identification information recording apparatus for recording identification information on an optical disk comprising:
   a turntable on which an optical disk is placed and that rotates the optical disk;
   an optical pickup having a laser source that emits a laser beam that forms an optical spot on the optical disk placed on the turntable for melting a reflection layer formed on the optical disk, said optical spot elongated along a radial direction of the optical disk;
   a relative position changing member that changes a relative position between the optical pickup and the optical disk in the radial direction of the optical disk placed on the turntable;
   an identification information recording member that records the identification information on the optical disk by controlling the emission of the laser beam from the laser source and the relative position between the optical pickup and the optical disk, the identification information recording member controlling the emission of the laser beam from the laser source to have an end portion of the elongated optical spot in the radial direction overlap a section of the identification information already formed; and a light intensity distribution setting member that sets a light intensity distribution of the elongated optical spot, wherein said light intensity distribution member comprises an optical axis tilting member that tilts the optical axis of the laser beam emitted from the laser source at an angle between and including 1.0° to 2.0° in the radial direction of the optical disk, and sets the light intensity distribution of the elongated optical spot so that a light intensity of the optical spot at an outer peripheral side in the radial direction is lower than a light intensity of the optical spot at an inner peripheral side in the radial direction.

15. An identification information recording apparatus according to claim 14, wherein the optical axis tilting member tilts the optical axis of the laser beam emitted from the laser source at an angle less than or equal to 2.0°.

16. An identification information recording apparatus according to claim 14, wherein the optical axis tilting member comprises an optical pickup tilting member that tilts the optical pickup in the radial direction of the optical disk.

17. An identification information recording apparatus according to claim 15, wherein the optical axis tilting member comprises an optical pickup tilting member that tilts the optical pickup in the radial direction of the optical disk.

* * * * *